United States Patent
Marrero (10) Patent No.: US 9,825,544 B2
(45) Date of Patent: Nov. 21, 2017

(54) POWER CONVERTERS

(71) Applicant: Meggitt US-SCPL, Securaplane Technologies, Inc., Oro Valley, AZ (US)

(72) Inventor: Joseph Marrero, Tucson, AZ (US)

(73) Assignee: Securaplane Technologies, Inc., Oro Valley, AZ (US)

( * ) Notice: Subject to any disclaimer, the term of this patent is extended or adjusted under 35 U.S.C. 154(b) by 0 days.

(21) Appl. No.: 14/242,547

(22) Filed: Apr. 1, 2014

(65) Prior Publication Data

US 2015/0280588 A1    Oct. 1, 2015

(51) Int. Cl.
*H02M 1/14*    (2006.01)
*H02M 3/335*    (2006.01)
*H02M 1/00*    (2006.01)

(52) U.S. Cl.
CPC ......... *H02M 3/33546* (2013.01); *H02M 1/14* (2013.01); *H02M 3/33507* (2013.01); *H02M 2001/0064* (2013.01)

(58) Field of Classification Search
CPC ............... H02M 1/14; H02M 3/33546; H02M 2001/0077
USPC ............................................ 363/21.04, 21.12
See application file for complete search history.

(56) References Cited

U.S. PATENT DOCUMENTS

| | | | |
|---|---|---|---|
| 5,038,263 A | 8/1991 | Marrero et al. | |
| 5,267,136 A | 11/1993 | Suga et al. | |
| 5,694,302 A | 12/1997 | Faulk | |
| 5,694,304 A | 12/1997 | Telefus et al. | |
| 5,712,772 A | 1/1998 | Telefus et al. | |
| 5,786,990 A * | 7/1998 | Marrero | H02M 3/3353 363/131 |
| 6,008,999 A * | 12/1999 | Marrero | H02M 3/156 323/222 |
| 6,037,755 A | 3/2000 | Mao et al. | |
| 6,307,761 B1 | 10/2001 | Nakagawa | |
| 7,019,503 B1 | 3/2006 | Ortiz et al. | |
| 7,157,886 B2 | 1/2007 | Agarwal et al. | |
| 7,403,402 B2 * | 7/2008 | Odell | H02M 3/335 363/21.01 |
| 7,994,731 B2 | 8/2011 | Biggs | |

(Continued)

OTHER PUBLICATIONS

Leu, Ching-Shan, *Improved Forward Topologies for DC-DC Applications with Built-in Input Filter*, Jan. 24, 2006, Dissertation submitted to the Faculty of the Virginia Polytechnic Institute and State University in partial fulfillment of the requirements for the degree of Doctor of Philosophy in Electrical Engineering, pp. 1-130, Blacksburg, Virginia.

(Continued)

*Primary Examiner* — Jeffrey Gblende
*Assistant Examiner* — Kyle J Moody
(74) *Attorney, Agent, or Firm* — Hackler Daghighian Martino & Novak (57) ABSTRACT

A power converter comprising: an input portion; a forward converter output portion with a ripple steering element; and a flyback converter output portion with a ripple steering element, wherein the input portion, forward converter output portion and flyback converter output portion are combined in an isolated magnetic configuration sharing a single transformer.

27 Claims, 7 Drawing Sheets

(56) References Cited

U.S. PATENT DOCUMENTS

| | | | | |
|---|---|---|---|---|
| 8,009,448 B2* | 8/2011 | Liu | ................... | H02M 3/33569 363/21.01 |
| 8,018,212 B1 | 9/2011 | Petricek | | |
| 8,027,177 B2* | 9/2011 | Hosotani | ............... | H02M 1/126 363/127 |
| 9,019,724 B2* | 4/2015 | Telefus | ............. | H02M 3/33523 363/21.01 |
| 2002/0167821 A1* | 11/2002 | Xing | ................ | H02M 3/33592 363/21.11 |
| 2004/0179377 A1* | 9/2004 | Tamura | ............. | H02M 3/33569 363/16 |
| 2004/0179378 A1* | 9/2004 | Tamura | ............. | H02M 3/33569 363/20 |
| 2006/0062024 A1* | 3/2006 | Hosotani | ........... | H02M 3/33569 363/16 |
| 2006/0120114 A1* | 6/2006 | Kawasaki | ......... | H02M 3/33592 363/16 |
| 2008/0025051 A1* | 1/2008 | Leu | ................... | H02M 3/33569 363/20 |
| 2009/0122579 A1 | 5/2009 | Senaj | | |
| 2009/0146632 A1* | 6/2009 | Julicher | ............ | H02M 3/33561 323/288 |
| 2010/0259953 A1* | 10/2010 | Matthews | ......... | H02M 3/33507 363/20 |
| 2012/0262142 A1 | 10/2012 | Chen et al. | | |
| 2015/0333640 A1* | 11/2015 | Persson | ............ | H02M 3/33538 363/21.04 |

OTHER PUBLICATIONS

Marrero, Joe, *Utilizing Ripple Steering in Forward and Flyback Converters and Input Filters*, Literature No. SNVA563, Texas Instruments Incorporated, © 2011, pp. 1-17, Dallas, Texas.

* cited by examiner

POWER CONVERTERS

FIELD

The present patent document relates to power converters and methods of using the same. More particularly, the present patent document relates to power converters that accept wide input voltages.

BACKGROUND

Power Convertors of all topologies generally convert input voltage of one type to an output voltage of another type. Examples include buck, boost, full bridge, inverters, etc. There are generally practical limitations that apply to the power conversion topology. One of these limitations for direct current to direct current (dc-dc) power converters is that for a given regulated output voltage, the input voltage can only vary within a certain window ranging from minimum input voltage to maximum input voltage. This range, although dependent on topology, is usually a ratio of approximately 2:1. An example is a full bridge dc-dc converter that regulates its output dc voltage at 5V only when the input voltage is between 18 Vdc and 36 Vdc, which is a ratio of 2:1 (36:18). Some power converters offer "wide range" inputs that allow the range of 8:1. However, these wide range power converters compromise (increase) the size of filter components due to their pulsating input and/or output currents.

A power converter capable of handling a wide range of input voltages while not significantly compromising the size of the filter components would be desirable.

SUMMARY OF THE EMBODIMENTS

In view of the foregoing, an object according to one aspect of the present patent document is to provide a power converter that accepts wide range of input voltages. Preferably, this is accomplished while producing non-pulsating input and output current. The methods and apparatuses of the present patent document address, or at least ameliorate one or more of the problems described above. To this end, a power converter is provided. In a preferred embodiment, the power converter comprises an input portion; a forward converter output portion with a ripple steering element; and a flyback converter output portion with a ripple steering element, wherein the input portion, forward converter output portion and flyback converter output portion are combined in an isolated magnetic configuration sharing a single transformer. In some embodiments, the input portion further includes a ripple steering element.

In a preferred embodiment, the power converter accepts an input voltage with a 60:1, 30:1 or 24:1 ratio. In other embodiments, the power converter accepts an input voltage with an 18:1 ratio. In still other embodiments, other ratios are possible.

In yet other embodiments, additional inductors may be added to further reduce the current ripple in the circuit. In some embodiments, the converter further comprises an inductor in series with the inductor of the input portion of the transformer. In some embodiments, the forward converter output portion further comprises an inductor in series with another inductor, a diode, a capacitor and ground. In some embodiments, other inductors may be added in various different combinations.

In a preferred embodiment, the inductors in the transformer representing the input portion, the forward converter output portion and the flyback converter output portion all have a different number of windings.

In another aspect of the present patent application, a power converter is provided. In a preferred embodiment, the power converter comprises: an input portion; a flyback converter output portion; a forward converter output portion; and a transformer with a first inductor corresponding to the input portion, a second inductor corresponding to the flyback converter output portion, and a third inductor corresponding to the forward converter output portion, wherein the first, second and third inductors each have a corresponding ripple steering element.

In preferred embodiments, the ripple steering element corresponding to the flyback converter and the ripple steering element corresponding to the input portion each have an inductor that is part of the transformer.

In some embodiments inductors may be added throughout the circuit to further mitigate ripple effects. In some embodiments, the power converter further comprises an inductor in series with the first inductor. In some embodiments, the power converter further comprises an inductor in series with the second inductor and a diode. In still some embodiments, the power converter further comprises an inductor in series with the third inductor, and additional inductor, a capacitor, a diode and ground.

As described more fully below, the apparatus and methods of the embodiments of a power converter accept a wide range of voltages without compromising the input filters. Further aspects, objects, desirable features, and advantages of the apparatus and methods disclosed herein will be better understood from the detailed description and drawings that follow in which various embodiments are illustrated by way of example. It is to be expressly understood, however, that the drawings are for the purpose of illustration only and are not intended as a definition of the limits of the claimed invention.

DETAILED DESCRIPTION OF THE EMBODIMENTS

The present patent describes a dc-dc power converter allowing an ultra-wide input voltage range. The ultra-wide input voltage range is achieved by combining both a ripple steering flyback converter and ripple steering forward converter in one isolated magnetic configuration. In a preferred embodiment the input range may be as high as 60:1, 30:1 or 24:1. Also in a preferred embodiment, the power converter does not compromise the size of the filter components. Accordingly, instead of a power converter with an input voltage range of 18V to 36V, (2:1), the input voltage range of the embodiments disclosed herein could be 9V to 162V (18:1) or an even wider input voltage range.

Figure 1:
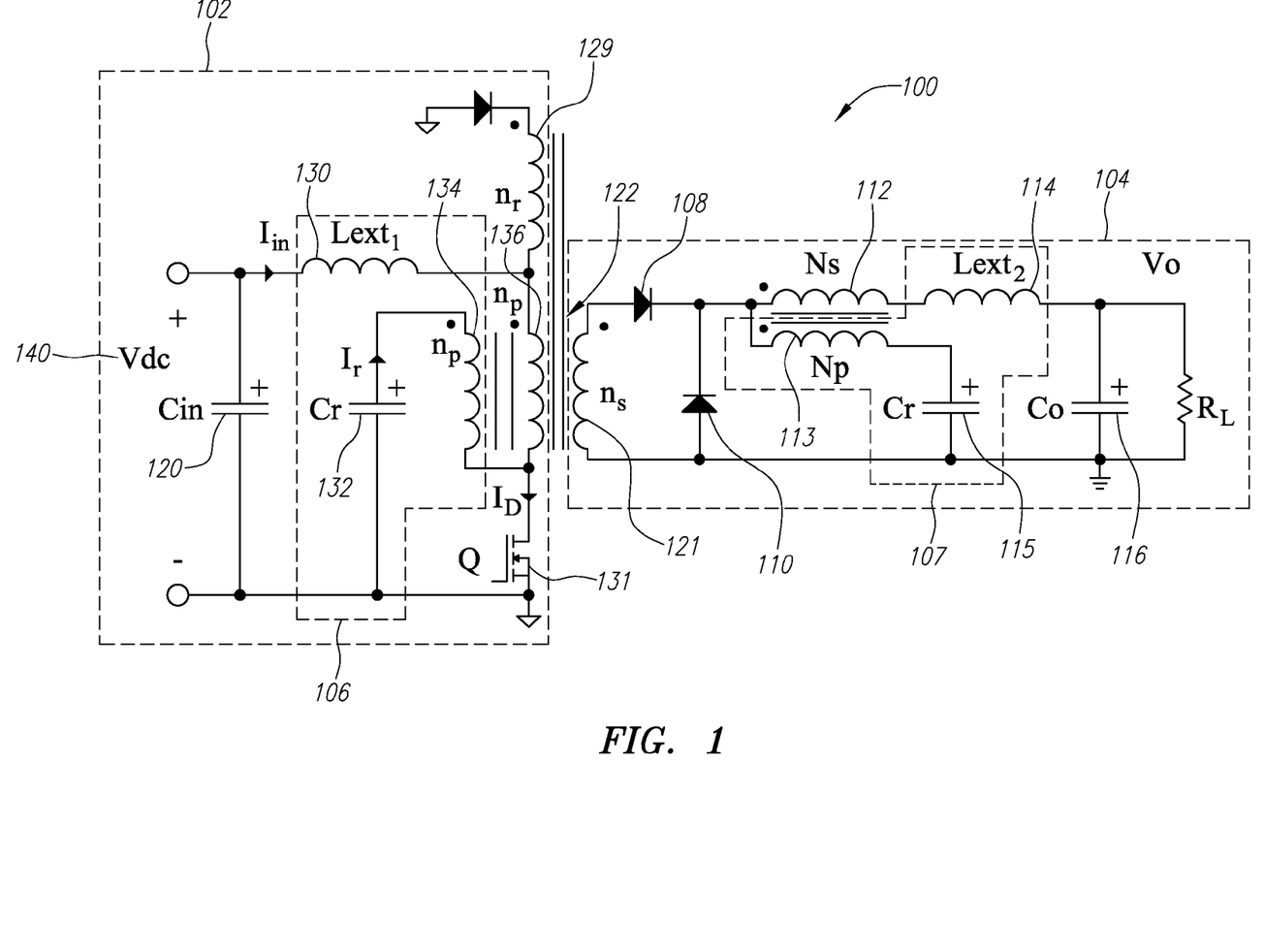
FIG. 1 illustrates a forward converter with non-pulsating input current and ripple steering in both the input and the output.

FIG. 1 illustrates a forward converter with non-pulsating input current and ripple steering in both the input 102 and the output 104. In the embodiment of FIG. 1, each of the input 102 and the output 104 has a ripple steering element 106 and 107 respectively. One of the major problems in using a conventional forward converter without ripple steering is the pulsating input current. In a conventional forward converter, this pulsating input current requires a large input capacitor 120 to handle the rms current and an EMI filter which has to filter out the large harmonics of the pulsed current. Ripple steering windings allow the pulsed currents to be internal to the converter and DC currents to appear on the input and/or output of the converter.

The input portion 102 of the forward converter 100 includes input capacitor 120, switch 131, winding 136, and reset winding 129. The input portion 102 is connected to the output portion 104 via winding 136, which forms the primary winding of transformer 122. In a conventional forward converter, when the switch 131 is on, current flows through the primary transformer winding 136. When the switch is off, there is no path for the current to go and, hence, it drops to zero. However in FIG. 1, the input side 102 further includes ripple steering element 106. Ripple steering element 106 includes the series combination of winding 134 with windings $n_p$ and capacitor 132 along with inductor 130. With a ripple winding 134 on the input, the current can flow through the ripple winding 134 when the switch 131 is off. When switch 131 is in the off position, reset winding 129 is used to reset the flux density to zero. In other embodiments, other methods of resetting the flux density may be used. Inductor 130 is used to further diminish the ripple and to prevent any pulsed current.

Winding 134 is a steering winding, magnetically coupled to winding 136 in transformer 122. Voltage source 140 in combination with switch 131, provides a first voltage source. In the embodiment of FIG. 1, the ripple steering element 106 is coupled between one end of primary winding 136 and the junction of voltage source 140 and switch 131. Accordingly, capacitor 132 in conjunction with switch 131 being off, provides a second voltage source.

In operation of the circuit of FIG. 1, the voltage of voltage source 140 is stored in capacitor 132 in combination with switch 131 when switch 131 is open. This causes capacitor 132 in combination with switch 131 to operate as a second voltage source across steering winding 134. The voltage from source 140 in combination with switch 131 substantially appears across primary winding 136 and the ripple current which ordinarily would have occurred in $I_{in}$, is steered from primary winding 136 through steering winding 134 and capacitor 132. As a consequence, the ripple current in primary winding 136 is set substantially equal to zero.

In a preferred embodiment, the turns ratio between the primary winding, $n_p$, and the ripple winding is 1:1 i.e., the number of turns of winding 136 ($n_p$) is equal to the number of turns of steering winding 134 ($n_p$). This enables steering winding 134 to be magnetically coupled to primary winding 136 without affecting the turns' ratio operation of transformer 122 and creating circulating current between primary winding 136 and steering winding 134. Preferably, steering winding 134 is wound closest to the core of transformer 122 and primary winding 136 is wound furthest from the core. If the turns' ratio is varied, there may be a large current flow during the turn off period.

Turning now to the output portion 104 of forward converter 100. The output portion 104 of the forward converter 100 includes diodes 108 and 110, inductor 112, and capacitor 116. The output portion 104 is connected to the input portion 102 via the secondary winding 121 of transformer 122. The output portion 104 implements ripple steering on the output side through the addition of a ripple steering element 107. Ripple steering element 107 includes inductor 113, (which functions as a steering winding), capacitor 115, and inductor 114. Inductor 114 is used to further diminish the ripple and to prevent any pulsed current.

Ripple steering inductor 113 is wound around a common core with inductor 112, to form a transformer whose primary winding is inductor 113 and whose secondary winding is inductor 112. Inductor 113 is wound with the same polarity as inductor 112. Inductor 112 has Ns turns and inductor 113 has Np turns, as indicated in FIG. 1. In a preferred embodiment Np is equal to Ns such that Ns/Np=1.

If $N_S/N_P=1$, then $L_{lp}=0$, which means that the leakage $L_{lp}$ must be zero in order for the ripple, $i_s$, to be zero. So, if the ripple winding is wound first (closest to the core) to minimize leakage $L_{lp}$, the turns ratio can be set to be 1:1, which makes it easy for mass production. In a preferred embodiment, a small external inductor 114 may be added in series with $L_{ls}$, to cause the output ripple current due to the error voltages to be small. In ripple steering, leakages play an important role, and by adding an external inductor 114, the output ripple current caused by the error voltages can be significantly decreased.

In the embodiment shown in FIG. 1, inductor 121, diode 108, inductor 112, inductor 114, and capacitor 116 are connected in series to ground as a low pass filter. Inductor 113 is connected in series with capacitor 115 to form a circuit branch. The circuit branch is connected in parallel with the branch consisting of inductor 112, inductor 114 and capacitor 116.

In operation, the input side 102 of the forward converter 100 induces a controllable voltage across secondary winding 121. The output side 104 ripple steering element 107 operate to reduce the ripple current at the output. In the preferred embodiment as shown in FIG. 1, inductor 114 is added to further reduce current ripple at the output.

Figure 2:
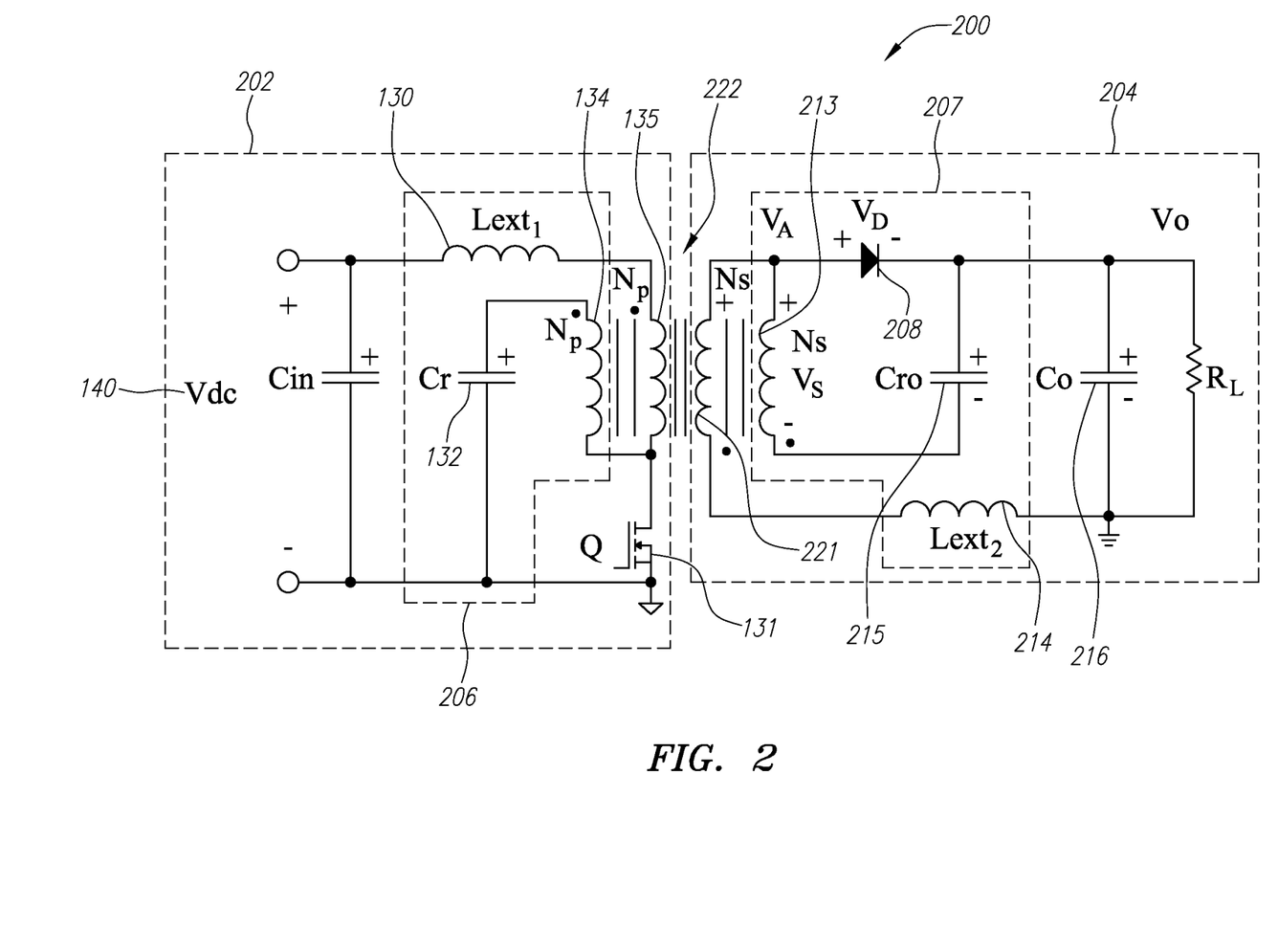
FIG. 2 illustrates a flyback converter with both non-pulsating input current and ripple steering in both the input and output.

FIG. 2 illustrates a flyback converter 200 with both non-pulsating input current and ripple steering in both the input 202 and output 204. A flyback converter may also be referred to as a "buck-boost" converter since the output can be greater than or less than the input voltage. The flyback converter is used in both AC/DC and DC/DC conversion with galvanic isolation between the input and any outputs. A flyback converter is equivalent to that of a boost converter with the inductor split to form a transformer. The transformer may be seen in FIG. 2 as the split inductors 135 and 221 forming transformer 222. The operating principals of both the boost converter and flyback converter are very close.

The input portion 202 of the flyback converter 200 with ripple steering element 206 is similar to the input portion 106 of forward converter 100 in FIG. 1 and therefore, further description is omitted. However, in operation the input portion 202 of flyback converter 200 shown in FIG. 2 works differently than the input portion 102 of the forward converter 100 shown in FIG. 1. In FIG. 2, an inductor 135 is present instead of the primary winding 136 in FIG. 1. In FIG. 2, the gapped coupled inductor stores energy when the switch 131 is closed and releases it when the switch 131 is open. In contrast, power is transferred as soon as the switch 131 is closed in the forward converter of FIG. 1. This is because FIG. 1 is a transformer, which is not gapped.

Turning now to the output portion 204 of the flyback converter 200. The output portion 204 of the flyback converter 200 includes diode 208 and capacitor 216. The output portion 204 is connected to the input portion 202 via the secondary winding 221 of transformer 222. The output portion 204 implements ripple steering on the output side through the addition of a ripple steering element 207. Ripple steering element 207 includes inductor 213, (which functions as a steering winding), capacitor 215, and inductor 214. Inductor 214 is used to further diminish the ripple and to prevent any pulsed current.

In the flyback converter 200, ripple steering winding 213 is magnetically coupled to winding 221 in transformer 222. Preferably, ripple steering inductor 213 is wound around a common core with inductor 221, to form a transformer whose primary winding is inductor 213 and whose secondary winding is inductor 221. Inductor 213 is wound with the same polarity as inductor 221 and each has the same number of turns Ns.

In the embodiment shown in FIG. 2, inductor 221, diode 208, inductor 214, and capacitor 116 are connected in series to ground as a low pass filter. Inductor 213 is connected in series with capacitor 215 to form a circuit branch. The circuit branch is connected in parallel with the branch consisting of inductor 214 and capacitor 216.

In operation, the input side 202 of the flyback converter 200 induces a controllable voltage across secondary winding 221. The output side 204 ripple steering element 207 operates to reduce the ripple current at the output. In the preferred embodiment as shown in FIG. 2, inductor 214 is added to further reduce current ripple at the output.

Figure 3:
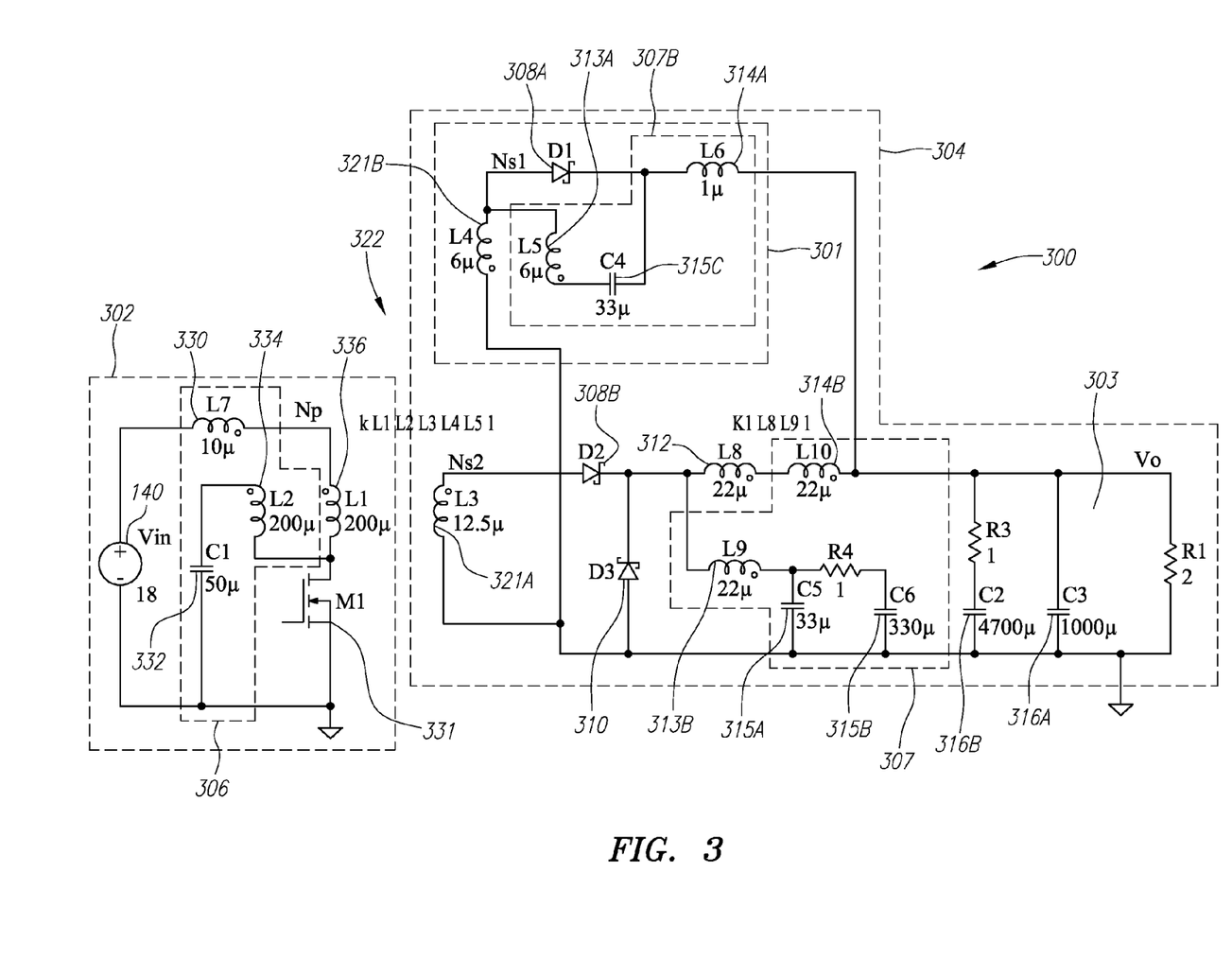
FIG. 3 illustrates a flyback converter and forward converter in combination with ripple steering on both the input and output.

FIG. 3 illustrates a flyback converter and forward converter in combination with ripple steering on both the input and output. The embodiment shown in FIG. 3 is a dc-dc converter 300 capable of accepting a wide range of input voltages 140 while producing non-pulsating input and output currents. As may be seen in FIG. 3, the preferred embodiments of a power converter 300 capable of supporting a wide input range 140 combines both a ripple steering flyback and a ripple steering forward converter into one isolated magnetic configuration.

As explained above, a flyback converter may also be referred to as a "buck-boost" converter since the output can be greater than or less than the input voltage. The input voltage range can be 8-to-1 such as from 10 volts to 80 volts. The transfer function from output to input is (Ns1/Np) D/D', where Ns1/Np is the turns ration of the flyback transformer, D is defined as the duty cycle of a pulse waveform and D'=1-D.

The forward converter is sometimes referred to as a "buck" converter since it steps down the output (i.e. the output is less than the input with a 1-to-1 transformer). The transfer function from output to input is (Ns2/Np) D, where Ns2/Np is the forward transformer. The input voltage range can be 3-to-1 such as from 80 volts to 240 volts.

Since the embodiment in FIG. 3 combines both a flyback converter and a forward converter, the input voltage range is the product of the two converters (8:1)*(3:1), which in a preferred embodiment may be from 24-to-1 such as from 10 volts to 240 volts. However in other embodiments, an even wider range of inputs may be accepted. In some embodiments, an input voltage range of 30:1 or even 60:1 may be used.

The embodiment shown in FIG. 3 consists of a transformer including 336 (L1), 334 (L2), 321A (L3), 321B (L4) and 313A (L5), which is the combined ripple steering flyback and the ripple steering forward converter.

In the embodiment shown in FIG. 3, inductor 336 (L1) and inductor 334 (L2), have the same number of turns signified as Np. In addition, inductor 321B (L4) and inductor 313A (L5) have the same number of turns signified as Ns1, inductor 321A (L3) has its own number of turns signified as Ns2.

Figure 4:
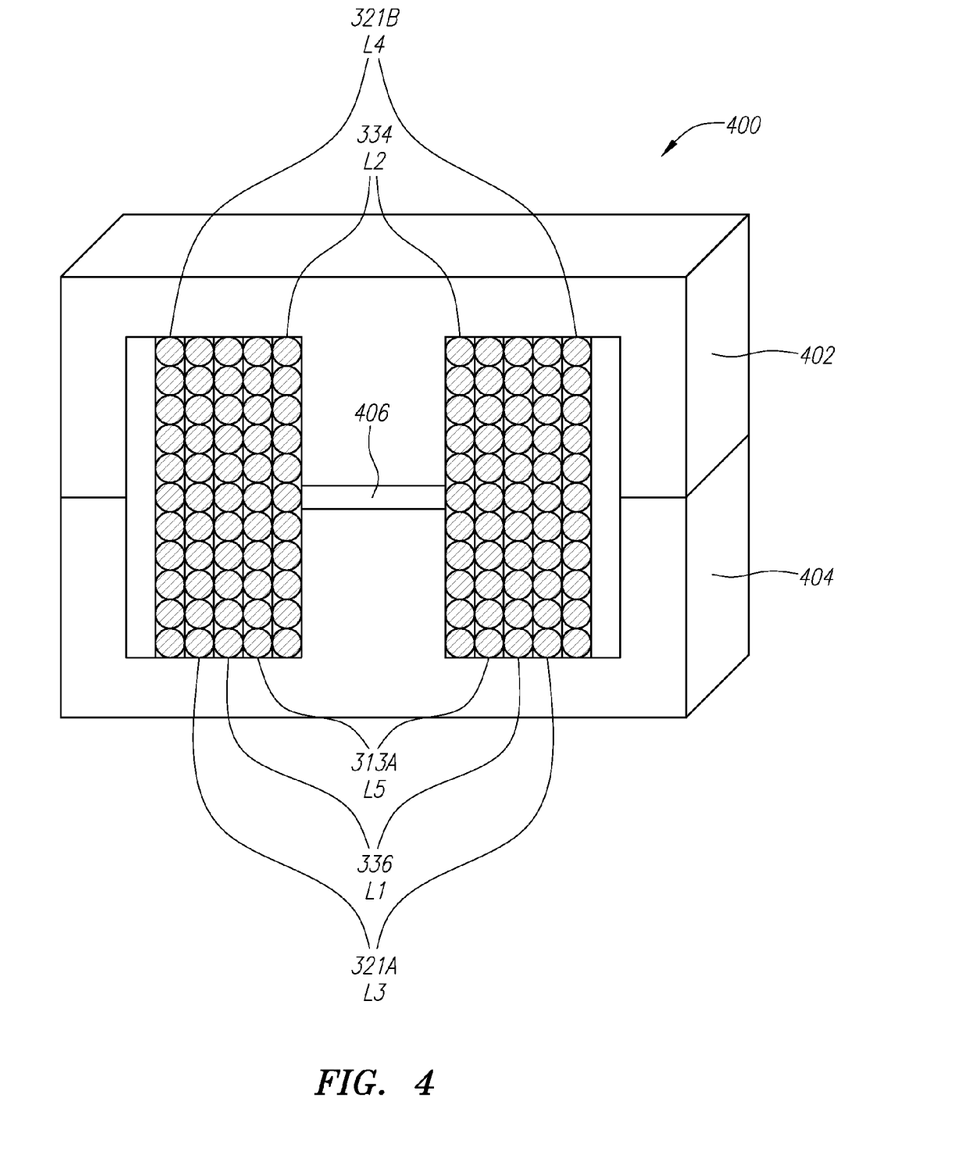
FIG. 4 illustrates a cross sectional view of one embodiment of a core for use with a wide input voltage converter.

In different embodiments, the inductors that form the magnetically isolated combination of the forward and flyback converters may be wound in different ways. FIG. 4 illustrates a cross sectional view of one embodiment of a core 400 for use with a wide input voltage range. Core 400 is comprised of two pieces 402 and 404. As may be seen in FIG. 4, in one embodiment, all the inductors may be wound around the core center. The ripple windings 334 and 313A should be wound closest to the core 400. Next is the primary winding 336 and last the outer windings 321A and 321B respectively.

As may be seen in FIG. 4, the core 400 has a gap 406 between core pieces 402 and 404. The gap provides the flyback functionality to inductor 313A and 321B allowing energy to be stored and released while not interfering with the function of the forward converter windings 321A and 334.

Figure 5:
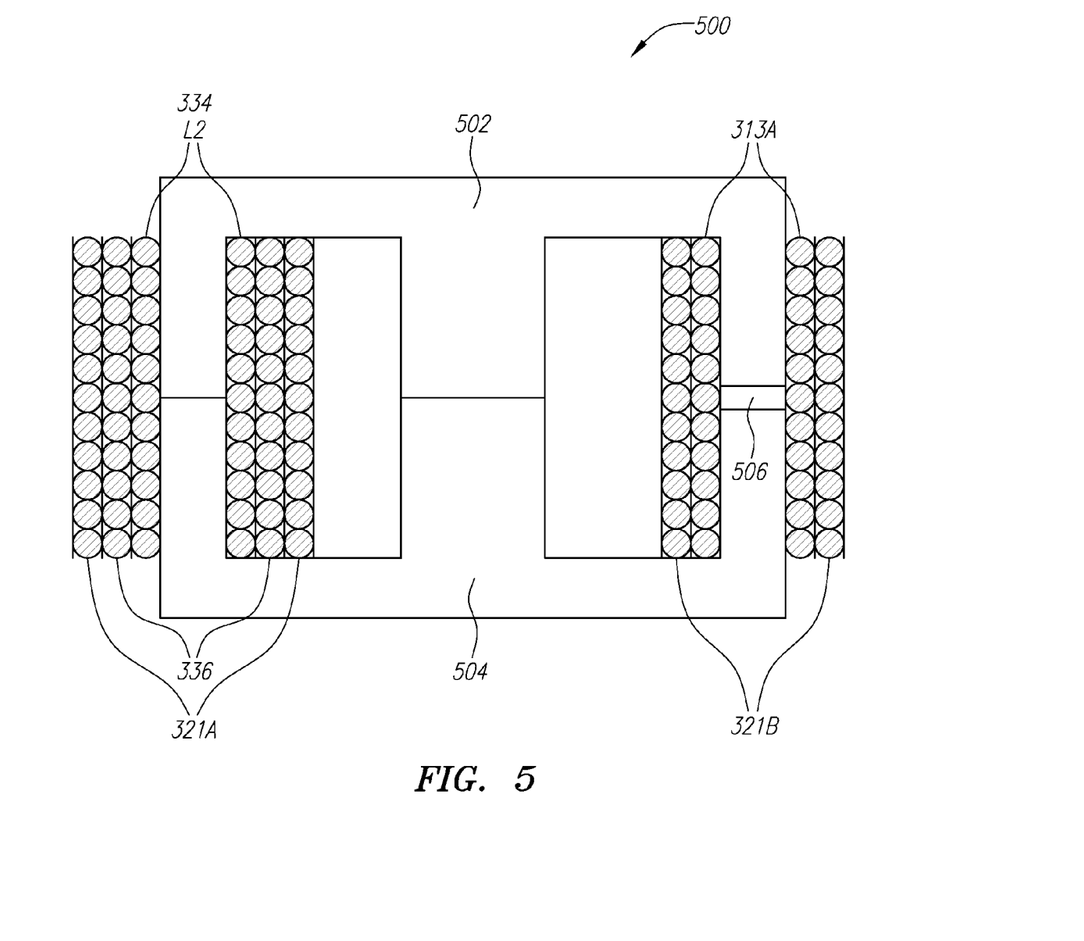
FIG. 5 illustrates a cross sectional view of one embodiment of a core for use with a wide input voltage converter.

FIG. 5 illustrates a cross sectional view of one embodiment of a core 500 for use with a wide input voltage range. Core 500 is comprised by two pieces 502 and 504. As may be seen in FIG. 5, in some embodiments, the inductor windings of the forward converter may be wound on one outside leg of the core 500 and the inductor windings of the flyback converter may be wound on the other outside leg of the core 500. As may be seen in FIG. 5, the flyback portion is on the right leg which includes gap 506. The flyback portion is comprised by windings 313A and 321B. The ripple steering winding from the input 334 along with the primary winding 336 and forward converter winding 321A are found on the left side of the transformer.

Returning to FIG. 3, the forward/flyback converter includes an input portion 302 and an output portion 304. When the input portion 302 induces a current in the winding 336 of the input portion 302, a corresponding current is induced in one or both the inductors 321A and 321B. Whether a current is induced in one or both of the inductors 321A and 321B and how much current is induced in each is dependent on the input voltage and turns ratio between Np:Ns1:Ns2. Inductors 321A and 321B are the windings on the output side of the forward converter and flyback converter respectively. Any fluctuations or ripples in the current of the output of the forward converter or flyback converter are handled by the ripple steering elements 307A and 307B respectively. In the embodiment shown in FIG. 3, a ripple steering element 306 is also included on the input side 302 of the converter 300 to handle current ripple on the input side.

The input portion 302 of the converter 300 includes voltage source 140, switch 331 and inductor 336. The input portion 302 is connected to the output portion 304 via inductor 336, which forms the primary winding of transformer 322. In the converter 300, when the switch 331 is on, current flows through the primary transformer winding 336. When the switch is off, there is no path for the current to go and, hence, it wants to drop. However in FIG. 3, the input side 302 further includes ripple steering element 306. Ripple steering element 306 includes the series combination of inductor 334 with windings Np and capacitor 332. With a ripple winding 334 on the input, the current can flow through the ripple winding 334 when the switch 331 is off. In a preferred embodiment, inductor 330 may also be added in series with primary transformer winding 336. Inductor 330 is used to further diminish the ripple and to prevent any pulsed current.

As explained above, winding 334 is a steering winding, magnetically coupled to winding 336 in transformer 322. Voltage source 140 in combination with switch 331, provides a first voltage source. In the embodiment of FIG. 3, the ripple steering element 306 is coupled between one end of primary winding 336 and the junction of voltage source 140 and switch 331. Accordingly, capacitor 332 in conjunction with switch 331 being in the off position, provides a second voltage source.

Turning now to the output portion 304 of converter 300. The output portion 304 of the converter 300 is comprised of flyback converter output portion 301 and the remaining portion, which is a forward converter output portion 303.

Forward converter output portion 303 includes diodes 308B and 310, inductor 312, and capacitors 316A and 316B. In the embodiment shown in FIG. 3, two capacitors 316A and 316B are used in parallel. However in other embodiments only a single capacitor 316A may be used. In a preferred embodiment, the capacitor 316B and R3 is used to dampen the Q of the circuit to avoid a rapid phase change which may result in closed loop stability issues.

The forward converter output portion 303 is connected to the input portion 302 via the secondary winding 321 of transformer 322. The forward converter output portion 304 implements ripple steering through the addition of a ripple steering element 307A. Ripple steering element 307A includes inductor 313B, (which functions as a steering winding), capacitors 315A and 315B, and inductor 314B. As may be seen in ripple steering element 307A, a ripple steering element may use a plurality of capacitors 315A and 315B in parallel instead of a single capacitor 315A. However, in other embodiments, more or less capacitors may be used. In a preferred embodiment, inductor 314B may also be added. Inductor 314B is used to further diminish the ripple and to further prevent pulsed current.

Ripple steering inductor 313B is wound around a common core with inductor 312, to form a transformer whose primary winding is inductor 313B and whose secondary winding is inductor 312. Inductor 313B is wound with the same polarity as inductor 312. Inductor 312 has Ns turns and inductor 113B has Np turns, as indicated in FIG. 1. In a preferred embodiment Np is equal to Ns such that Ns/Np=1. While in a preferred embodiment the ratio of Ns to Np turns is always 1, the number of turns may be varied depending on the desired value of inductance.

If $N_S/N_P=1$, then $L_{lp}=0$, which means that the leakage $L_{lp}$ must be zero in order for the ripple, is, to be zero. So, if the ripple winding is wound first (closest to the core) to minimize leakage $L_{lp}$, the turns ratio can be set to be 1:1, which makes it easy for mass production. In a preferred embodiment, a small external inductor 314 may be added in series with $L_{ls}$, to cause the output ripple current due to the error voltages to be small. In ripple steering, leakages play an important role, and by adding an external inductor 314B, the output ripple current caused by the error voltages can be significantly decreased.

In the embodiment shown in FIG. 3, inductor 321A, diode 308B, inductor 312, inductor 314B, and capacitor 316A are connected in series to ground as a low pass filter. Inductor 313B is connected in series with capacitor 315A to form a circuit branch with an additional arm that places capacitor 315B in parallel with 315A. The circuit branch is connected in parallel with the branch consisting of inductor 312, inductor 314 and capacitor 316.

In operation, the input side 302 of the converter 300 induces a controllable voltage across secondary winding 321A. The forward converter output side 303 ripple steering element 307 operates to reduce the ripple current at the output. In the preferred embodiment as shown in FIG. 3, inductor 314 is added to further reduce current ripple at the output.

Turning now to the flyback converter output portion 301 of converter 300. In the embodiment shown in FIG. 3, the flyback convert output portion is placed in parallel with the forward converter output portion 303 and connects after inductor 314B (or inductor 312 if 314B is not present) and to the grounded side of inductor 321A.

The flyback converter output portion 301 of converter 300 includes diode 308B and shares capacitors 316A and 316B with the forward converter output portion (For simplicity these are not circled as part of the flyback converter output portion in FIG. 3 but are in fact a shared element). The flyback converter output portion 304 is connected to the input portion 302 via the secondary winding 321A of transformer 322.

In a preferred embodiment, the flyback converter output portion 301 implements ripple steering through the addition of a ripple steering element 307B. Ripple steering element 307B includes inductor 313A, (which functions as a steering winding), capacitor 315C and inductor 314A. Inductor 314A is used to further diminish the ripple and to prevent any pulsed current.

In converter 300, ripple steering winding 313A is magnetically coupled to winding 321B in transformer 322. Preferably, ripple steering inductor 313A is wound around a common core with inductor 321B, to form a transformer whose primary winding is inductor 313A and whose secondary winding is inductor 321B. In a preferred embodiment, inductor 313A is wound with the same polarity as inductor 321B and each has the same number of turns Ns1.

In the embodiment shown in FIG. 3, inductor 321B, diode 308A, inductor 314A, and capacitor 316A/316B are connected in series to ground as a low pass filter. Inductor 313A is connected in series with capacitor 315C to form a circuit branch. The circuit branch is connected in parallel with the branch consisting of inductor 314A and capacitor 316A/316B.

In operation, the input side 302 of the converter 300 induces a controllable voltage across secondary winding 321B. The flyback converter output side 301 ripple steering element 307B operates to reduce the ripple current at the output. In the preferred embodiment as shown in FIG. 3, inductor 314A is added to further reduce current ripple at the output.

In a preferred embodiment, additional inductors 314A (L6), 330 (L7), and 314B (L10) may be used to diminished the ripple and to prevent any pulsed current. In other embodiments, one or more of inductors 330 (L7), and 314B (L10) may be omitted. In a preferred embodiment, inductor 314A (L6) is always present because omitting inductor 314A would result in a pulsed current at the output.

In operation, the flyback converter portion of the overall converter in FIG. 3 works in harmony with the forward converter portion to produce a steady output despite a wide input voltage range. As the input voltage rises, the forward converter takes over and is the main contributor to the output voltage. Accordingly, at higher voltages, inductor 321A has a larger induction of current while inductor 321B has a lower induction of current. As the voltage drops, the current in inductor 321B begins to rise and the current in inductor 321A begins to fall.

Figure 6:
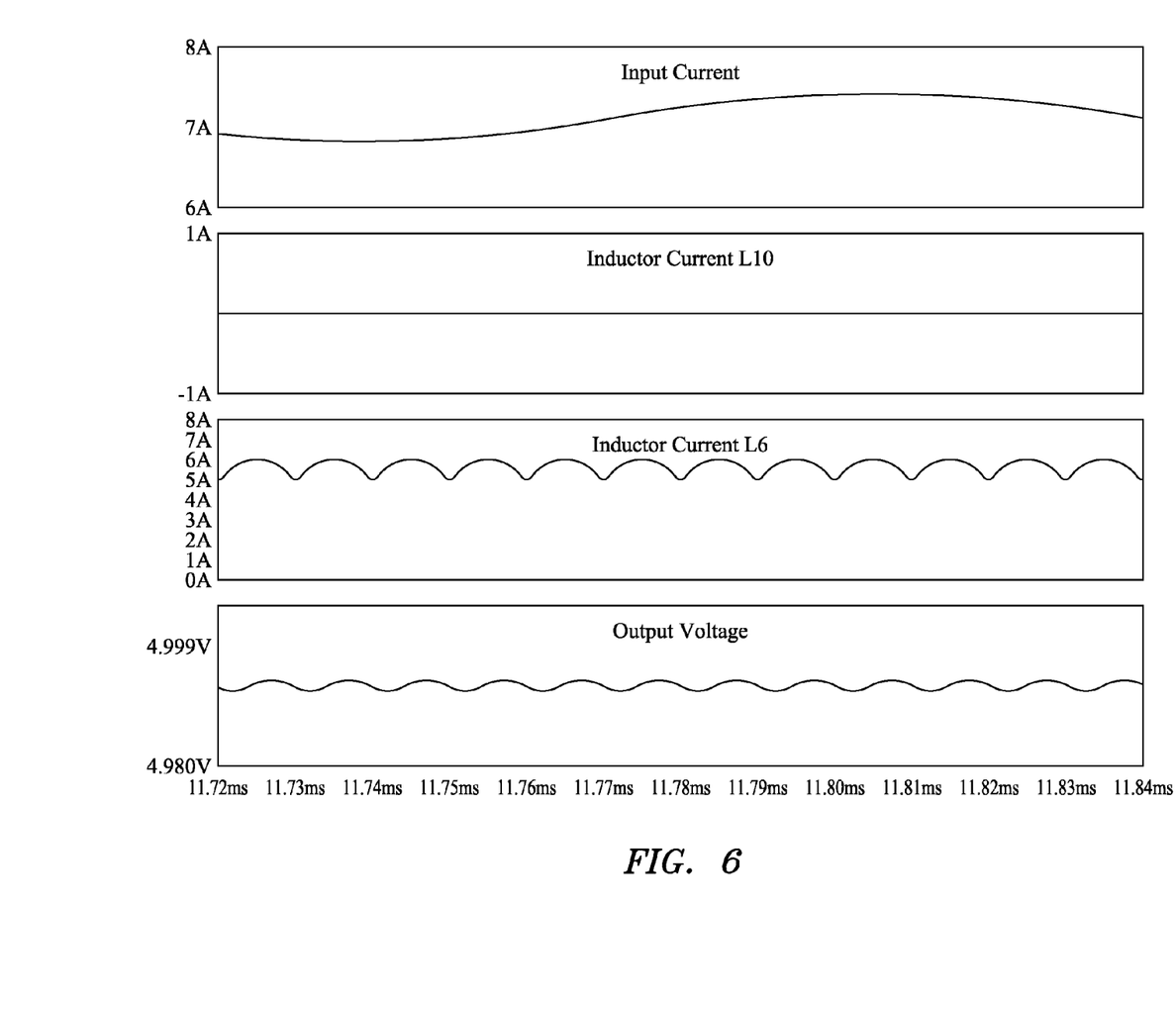
FIG. 6 illustrates output and inductor simulated waveforms for the embodiment of FIG. 3 with an input voltage of 5 volts.

FIG. 6 illustrates output and inductor simulated waveforms for the embodiment of FIG. 3 with an input voltage of 5 volts. As may be seen in FIG. 6, with an input voltage of only 5 volts, the input current rises to 7 amps. The low input voltage means that the Flyback converter will be the primary converter and this is manifested in the higher current of 5-6 amps in inductor 314A (L6) versus only 1 amp in the inductor 314B (L10) of the forward converter.

Figure 7:
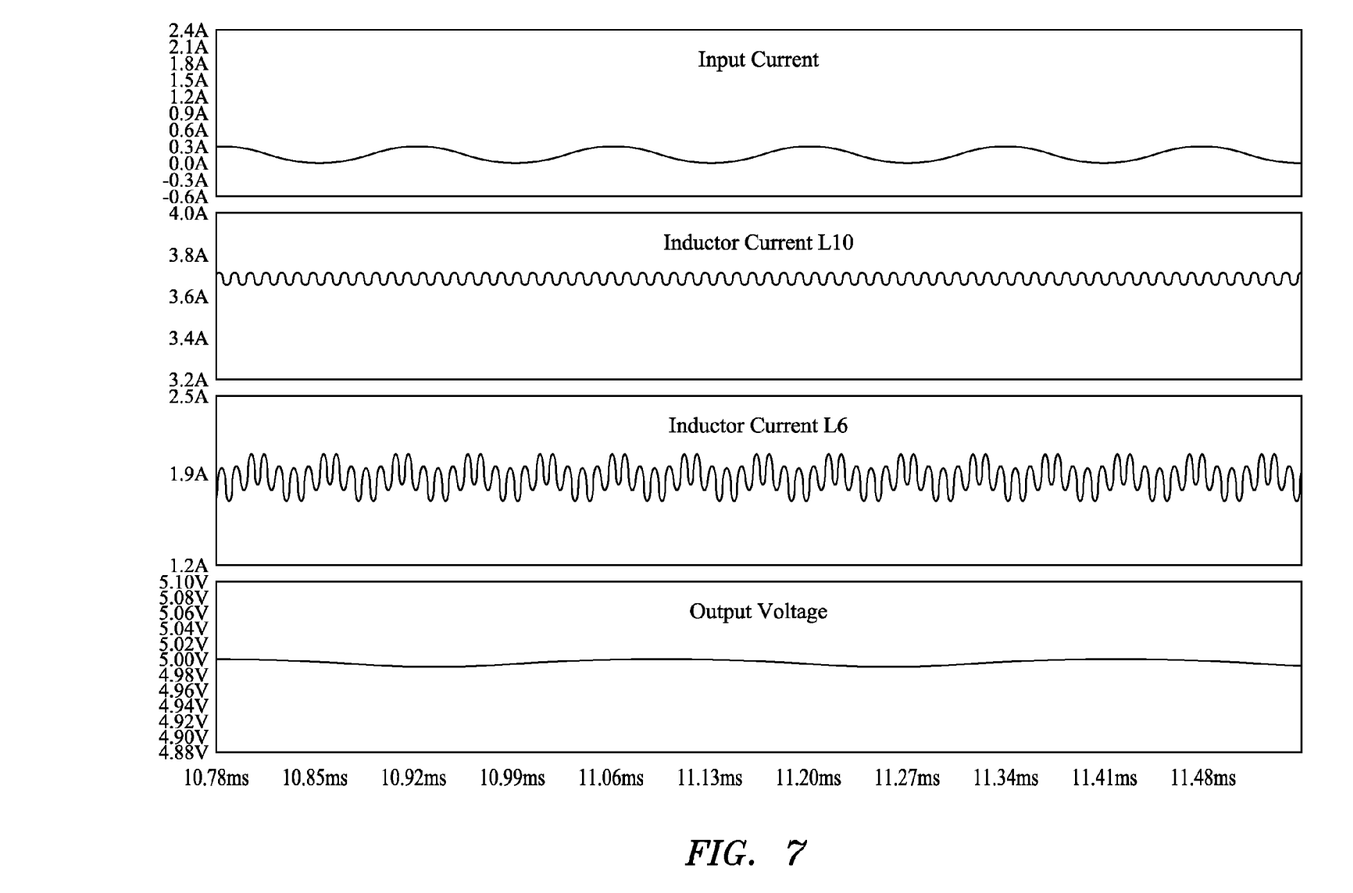
FIG. 7 illustrates output and inductor simulated waveforms for the embodiment of FIG. 3 with an input voltage of 300 volts.

FIG. 7 illustrates output and inductor simulated waveforms for the embodiment of FIG. 3 with an input voltage of 300 volts. As may be seen in FIG. 7, with an input voltage of 300 volts, an input current of less than 0.3 amps is needed. The high input voltage means that the Forward converter portion will be the primary converter and this is manifested in the higher current of 3.7 amps in inductor 314B (L10) versus only 1.9 amps in the inductor 314A (L6) of the flyback converter portion.

The simulated waveforms in FIGS. 6 and 7 represent a 60:1 input variation. This large variation is made possible with a constant output voltage due to the continuous contribution of the flyback winding. However, this ratio is a function of the load current and efficiency. As the efficiency is decreased the ratio will decrease, therefore, a 30:1 ratio is more realistic for implementation. Depending on the input voltage range desired, different embodiments with different capabilities to support different input voltage ranges may be constructed by varying the turns' ratio Np:Ns1:Ns2.

Other electrical changes and modifications to the elements of FIG. 3 may be made in order to tweak the output as is well known in the art. Moreover, although specific values are used for the components shown in FIG. 3, these values are only for teaching an exemplary example and in other embodiments other values may be used.

Although the embodiments have been described with reference to preferred configurations and specific examples, it will readily be appreciated by those skilled in the art that many modifications and adaptations of the converters and methods described herein are possible without departure from the spirit and scope of the embodiments as claimed hereinafter. Thus, it is to be clearly understood that this description is made only by way of example and not as a limitation on the scope of the embodiments as claimed below.

What is claimed is:

1. A power converter comprising:
an input portion including a switch and a ripple steering element;
a forward converter output portion with a ripple steering element; and
a flyback converter output portion with a ripple steering element, wherein the input portion, forward converter output portion and flyback converter output portion are combined in an isolated magnetic configuration sharing a single transformer with a gapped coupled inductor and,
wherein the single transformer includes a gapped center portion with at least five separate windings around the gapped center portion and,
wherein a first winding of the at least five separate windings is part of the ripple steering element of the flyback converter output portion and a second winding of the at least five separate windings is part of the ripple steering element of the input portion and the first and second windings are wound closer to the gapped center portion than any other of the at least five separate windings.

2. The power converter of claim 1, wherein a ratio of a maximum voltage the power converter accepts to a minimum voltage the power converter accepts is 24:1.

3. The power converter of claim 1, wherein a ratio of a maximum voltage the power converter accepts to a minimum voltage the power converter accepts is 18:1.

4. The power converter of claim 1, wherein the forward converter output portion further comprises an inductor in series with another inductor, a diode, a capacitor and ground.

5. The power converter of claim 1, wherein inductors in the single transformer representing the input portion, the forward converter output portion and the flyback converter output portion all have a different number of turns.

6. The power converter of claim 1, wherein a third winding of the at least five separate windings is a primary winding of the input portion and is wound after a first and a second winding of the at least five separate windings.

7. The power converter of claim 1, wherein the flyback converter output portion and the forward converter output portion are electrically connected in parallel.

8. The power converter of claim 1, wherein the gapped center portion is a single central column.

9. A power converter comprising:
an input portion including a switch;
a flyback converter output portion;
a forward converter output portion; and
a transformer with a first inductor corresponding to the input portion, a second inductor corresponding to the flyback converter output portion, and a third inductor corresponding to the forward converter output portion, wherein the first, second and third inductors each have a corresponding ripple steering element and,
wherein the ripple steering element corresponding to the flyback converter output portion and the ripple steering element corresponding to the input portion each have an inductor that is part of the transformer and,
wherein the inductor corresponding to the ripple steering element of the flyback converter output portion and the second inductor are both wound around an outer gapped leg of the transformer.

10. The power converter of claim 9, wherein a ratio of a maximum voltage the power converter accepts to a minimum voltage the power converter accepts is 24:1.

11. The power converter of claim 9, wherein a ratio of a maximum voltage the power converter accepts to a minimum voltage the power converter accepts is 18:1.

12. The power converter of claim 9, wherein the first, second and third inductors are wound around a gapped center of the transformer.

13. The power converter of claim 9, further comprising an inductor in series with the third inductor, an additional inductor, a capacitor, a diode and ground.

14. The power converter of claim 9, wherein the flyback converter output portion and the forward converter output portion are electrically connected in parallel.

15. The power converter of claim 9, wherein the transformer includes a continuous outer leg and the third inductor is wound around the continuous outer leg.

16. A power converter comprising:
an input portion including a switch and a ripple steering element;
a forward converter output portion with a ripple steering element; and a flyback converter output portion with a ripple steering element, wherein the input portion, forward converter output portion and flyback converter output portion are combined in an isolated magnetic configuration sharing a single transformer with a gapped coupled inductor and, wherein the single transformer includes at least five separate windings divided across two outer legs wherein one leg is gapped and includes windings for the flyback converter output portion with the ripple steering element.

17. The power converter of claim 16, wherein the transformer includes one continuous outer leg wherein the forward converter output portion is wound around the continuous outer leg.

18. The power converter of claim 16, wherein a ratio of a maximum voltage the power converter accepts to a minimum voltage the power converter accepts is 24:1.

19. The power converter of claim 16, wherein a ratio of a maximum voltage the power converter accepts to a minimum voltage the power converter accepts is 18:1.

20. The power converter of claim 16, wherein the forward converter output portion further comprises an inductor in series with another inductor, a diode, a capacitor and ground.

21. The power converter of claim 16, wherein inductors in the single transformer representing the input portion, the forward converter output portion and the flyback converter output portion all have a different number of turns.

22. A power converter comprising:
an input portion including a switch and a ripple steering element;
a forward converter output portion with a ripple steering element; and
a flyback converter output portion with a ripple steering element, wherein the input portion, forward converter output portion and flyback converter output portion are combined in an isolated magnetic configuration sharing a single transformer with a gapped coupled inductor and,
wherein the single transformer includes a gapped center portion with at least five separate windings around the gapped center portion and,
wherein a third winding of the at least five separate windings is a primary winding of the input portion and is wound after a first and a second winding of the at least five separate windings.

23. The power converter of claim 22, wherein a ratio of a maximum voltage the power converter accepts to a minimum voltage the power converter accepts is 24:1.

24. The power converter of claim 22, wherein a ratio of a maximum voltage the power converter accepts to a minimum voltage the power converter accepts is 18:1.

25. The power converter of claim 22, wherein the forward converter output portion further comprises an inductor in series with another inductor, a diode, a capacitor and ground.

26. The power converter of claim 22, wherein inductors in the single transformer representing the input portion, the forward converter output portion and the flyback converter output portion all have a different number of turns.

27. The power converter of claim 22, wherein the first winding of the at least five separate windings is part of the ripple steering element of the flyback converter output portion and a second winding of the at least five separate windings is part of the ripple steering element of the input portion and the first and second windings are wound closest to the gapped center portion.

* * * * *